J. McN. SMITH.

Insect-Traps.

No. 137,255.  Patented March 25, 1873.

Witness:
Henry N. Miller
C. L. Evert.

Inventor,
J. McN. Smith,
per
Alexander & Mason
Attorneys.

UNITED STATES PATENT OFFICE.

J. McN. SMITH, OF FORT WAYNE, INDIANA.

IMPROVEMENT IN INSECT-TRAPS.

Specification forming part of Letters Patent No. 137,255, dated March 25, 1873.

*To all whom it may concern:*

Be it known that I, J. McN. SMITH, of Fort Wayne, in the county of Allen and in the State of Indiana, have invented certain new and useful Improvements in Insect-Traps; and do hereby declare that the following is a full, clear, and exact description thereof, reference being had to the accompanying drawing and to the letters of reference marked thereon making a part of this specification.

The nature of my invention consists in the construction and arrangement of a fly or insect trap, as will be hereinafter more fully set forth.

In order to enable others skilled in the art to which my invention appertains to make and use the same, I will now proceed to describe its construction and operation, referring to the annexed drawing, in which—

Figure 1:
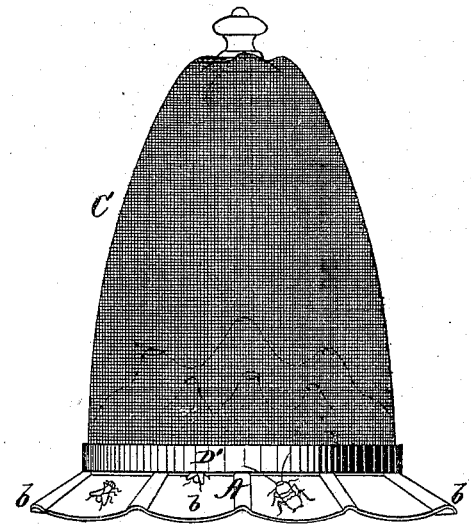
Figure 2:
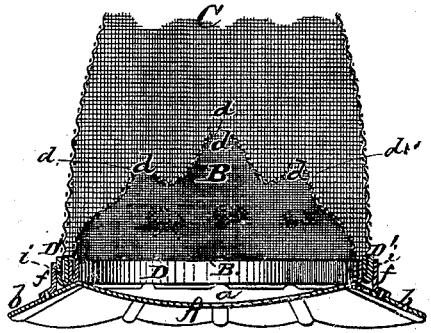
Figure 3:
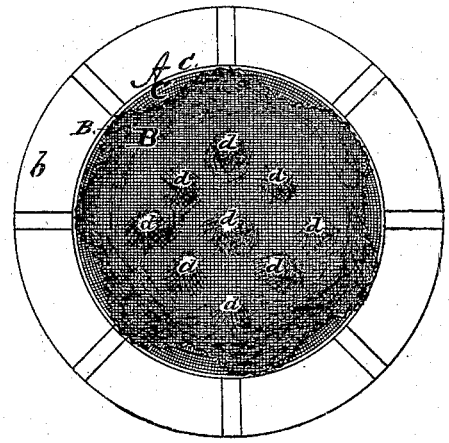

Figure 1 is a side view, Fig. 2 a vertical section, and Fig. 3 a horizontal section, of my trap.

A represents a corrugated metal pan pressed or molded either in round, square, oval, or other suitable shape, with one or more cavities, $a$, below the line of light. The outer edge $b$ of the pan is beveled downward, as shown, thus affording easy access to the trap. The trap itself consists of an interior cone, B, of wire-cloth, provided with any desired number of cone-points, $d$ $d$, open at their upper ends. This wire-cone is surrounded and covered by a wire top, C. The cone and top may be pressed or woven, and either plain, corrugated, or shouldered, as desired. The lower edge of the cone B is attached to a metal band, D, fitting snugly within a similar band, D', at the lower end of the top C. On the pan A are two upward-projecting ears, $f f$, opposite each other, said ears having each an inward-projecting pin, $i$, which fits in a hole on the band D', and thus holds the trap on the pan. The shape of the pan A allows the flies or other insects an easy, light, and natural way to the food which is placed in the cavity or cavities $a$ in the center of the pan, the corrugations on the outer bevel $b$ being high enough when the wire top is placed on them to allow easy ingress for flies, &c., as well as allowing an easy escape of the scent of the food which attracts them. This concavity also is of such depth that flies cannot see light, except upward, and when satisfied with food or disturbed they will fly toward the light which the wire top admits so freely, and as soon as they strike the cone they almost invariably walk until they pass through the orifices $d$ $d$ into the trap above, from which there is no escape.

This entire trap can be made very cheaply and prove a great benefit in every house.

Having thus fully described my invention, what I claim as new, and desire to secure by Letters Patent, is—

The combination of the corrugated pan A, having cavity $a$ and beveled edge $b$, the cone B with open conical points $d$ $d$ and band D, the top C with band D', and the ears $f f$ with pins $i$ $i$, all constructed and arranged substantially as and for the purposes herein set forth.

In testimony that I claim the foregoing I have hereunto set my hand this 23d day of August, 1872.

J. McN. SMITH.

Witnesses:
WILLIAM CARTER,
WILLIAM T. JENISON.